Feb. 13, 1934. L. S. FRAPPIER ET AL 1,946,681
SUPPORT AND HOUSING FOR PHOTO-ELECTRIC CELLS
Original Filed March 30, 1929
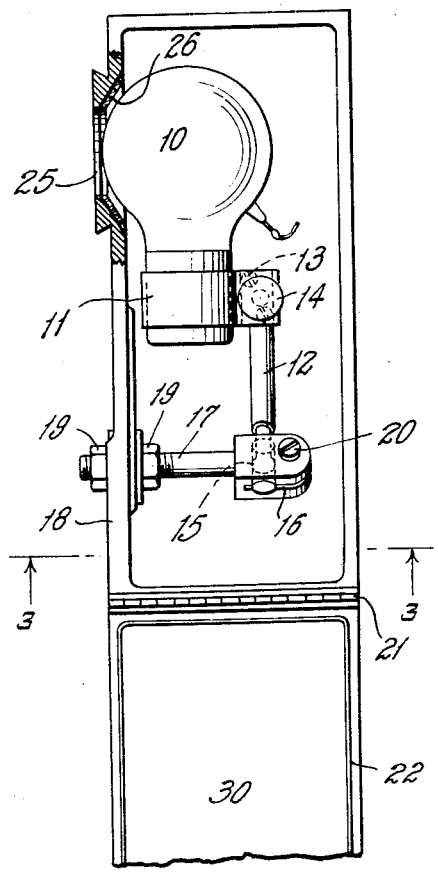
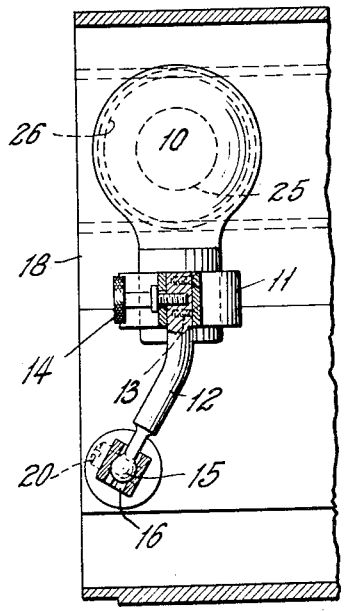
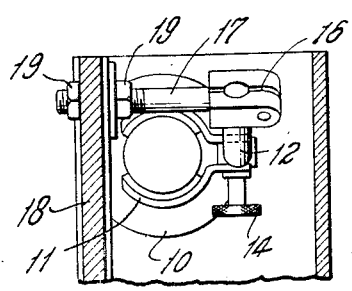
INVENTORS
Louis S. Frappier
and Ewald Boecking
BY
Austin & Dix
ATTORNEYS Patented Feb. 13, 1934

1,946,681

UNITED STATES PATENT OFFICE 1,946,681

SUPPORT AND HOUSING FOR PHOTOELECTRIC CELLS

Louis Simon Frappier and Ewald Boecking, Brooklyn, N. Y., assignors to International Projector Corporation, New York, N. Y., a corporation of Delaware Original application March 30, 1929, Serial No. 351,393. Divided and this application July 24, 1930. Serial No. 470,354

6 Claims. (Cl. 250—27.5)

This invention relates to motion picture projection machines, and more particularly to a mechanism for reproducing sound from a photographic sound record.

The present application is a division of our copending application Serial No. 351,393, filed March 30, 1929, for sound reproducing mechanism and relates particularly to the photoelectric cell chamber and support.

An object of the invention is to provide a simplified support for a photoelectric cell whereby the cell may be readily adjusted in all directions and brought into proper alignment with the projection ray.

Another object is to provide a light proof chamber for the photoelectric cell whereby the operation thereof is not interfered with by light from extraneous sources.

A still further object is to provide a cheap, simple and dependable device of the type above indicated.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which Fig. 1 is a side elevation of the photoelectric cell and support therefor;

Fig. 2 is an end elevation of the photoelectric cell showing the support partly in section; and Fig. 3 is a section taken on the line 3—3 of Fig. 1.

Like reference characters denote like parts in the several figures of the drawing.

In the following description and in the claims parts will be identified by specific names for convenience, but they are intended to be as generic in their application to similar parts as the art will permit.

Referring to the drawing more in detail the invention is shown as comprising a photoelectric cell 10 which is mounted in a split socket 11. One end of said socket is rigidly secured to rod 12 as by screw 13, and the other end of said socket is adjustably secured thereto by set screw 14. By suitable adjustment of set screw 14 the socket may be clamped about the base of cell 10 for securely holding said base therein.

Rod 12 is provided at its end with a ball 15 which is mounted in a split socket 16. Said socket 16 is carried by rod 17 which is mounted in wall 18 of the photoelectric cell compartment and is adjustably secured in said wall by nuts 19. Screw 20 (Fig. 1) threaded into socket 16 permits the socket to be clamped about ball 15 for securing the cell in the desired position.

The cell compartment is closed by door 30 which is hingedly secured thereto as by hinge 21 and is provided with a liner 22 of resilient material, such as felt or rubber, which is adapted to make contact with wall 18 when the door is closed and forms a positive seal to prevent access of light into the compartment.

Housing 18 is provided with an aperture 25 which is adapted to register with photoelectric cell 10. A washer 26 of resilient material, such as felt, is positioned around said aperture to prevent injury to the cell and form an effective light seal. Said washer is provided with an aperture which registers with aperture 25 and permits the desired rays to be applied to cell 10.

It will be noted that the above described mechanism may be adjusted so as to bring cell 10 into any desired relationship to aperture 25 by means of the various adjustments of the socket 11 and rods 12 and 17. Rod 17, for example, can be adjusted longitudinally by varying the position of nuts 19. Rod 12 can be angularly adjusted with respect to rod 17 by means of ball 15 and socket 16 and clamped in the desired position by set screw 20. The photoelectric cell 10 can also be adjusted rotatably and vertically in split socket 11 and clamped by means of set screw 14. Furthermore, when it is desired to remove the cell from the assembly it is only necessary to loosen set screw 14 and then remove the cell from socket 11. This can be accomplished without disturbing any of the other adjustments.

The flexible material 22 on door 30 serves to maintain the light seal and assure the operation of the system without interference of extraneous light rays with the photoelectric cell and at the same time compensates for any inequalities in workmanship which would otherwise prevent the tight fit between the door and housing 18.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination, a photoelectric cell compartment having an aperture therein, a photoelectric cell, means for supporting said cell in said compartment and adjusting the position thereof into correct alignment with said aperture and a flexible washer mounted between said cell and said aperture to prevent injury to said cell and form a light seal.

2. A photoelectric cell compartment comprising a housing having an aperture therein, means for mounting a photoelectric cell in said compartment and adjusting said cell with respect thereto whereby a correct alignment thereof with said aperture may be obtained, a flexible member interposed between said cell and said aperture and having an aperture in register with said first mentioned aperture, said member serving to prevent injury to said cell and to form a light seal, a door for said chamber and a liner of flexible material mounted on said door in a position to contact with the walls of said chamber when said door is in closed position for forming a light seal and preventing undesired light rays from reaching said cell.

3. In combination, a housing forming a photoelectric cell chamber, said housing having an aperture therein, a photoelectric cell in said chamber, means for mounting said cell in alignment with said aperture, means providing vertical adjustment of said cell, means providing transverse adjustment thereof with respect to said aperture, and means forming a light seal between said cell and the walls of said aperture.

4. In combination, a housing forming a photoelectric cell chamber, said housing having an aperture therein, a photoelectric cell in said chamber, means for mounting said cell in alignment with said aperture comprising a socket, a support therefor, means providing substantially universal adjustment of said support with respect to said aperture, and means to effect a light seal between said cell and the walls of said aperture.

5. In combination, a housing forming a photoelectric cell chamber, said housing having an aperture therein, a photoelectric cell in said chamber, means for mounting said cell in alignment with said aperture comprising a socket, a support therefor, means to vertically adjust said socket with respect to said support, means carried by said housing for mounting said support for substantially universal movement, and means to effect a light seal between said cell and the walls of said aperture.

6. In combination, a photoelectric cell, a housing forming a substantially light sealed chamber for said cell, said housing having an aperture adapted to admit light to said cell, means mounting said cell in alignment with said aperture, and means for adjusting the relative positions of said cell and said aperture, and means forming a light seal between said cell and the walls of said aperture.

LOUIS S. FRAPPIER.
EWALD BOECKING.